July 14, 1959  E. W. LIBBY  2,894,410

VEHICLE TRANSMISSION CONTROL

Filed Sept. 6, 1956  3 Sheets-Sheet 1

INVENTOR.
Edward W. Libby
BY
Harness, Dickey & Pierce
ATTORNEYS

July 14, 1959  E. W. LIBBY  2,894,410
VEHICLE TRANSMISSION CONTROL
Filed Sept. 6, 1956  3 Sheets-Sheet 2
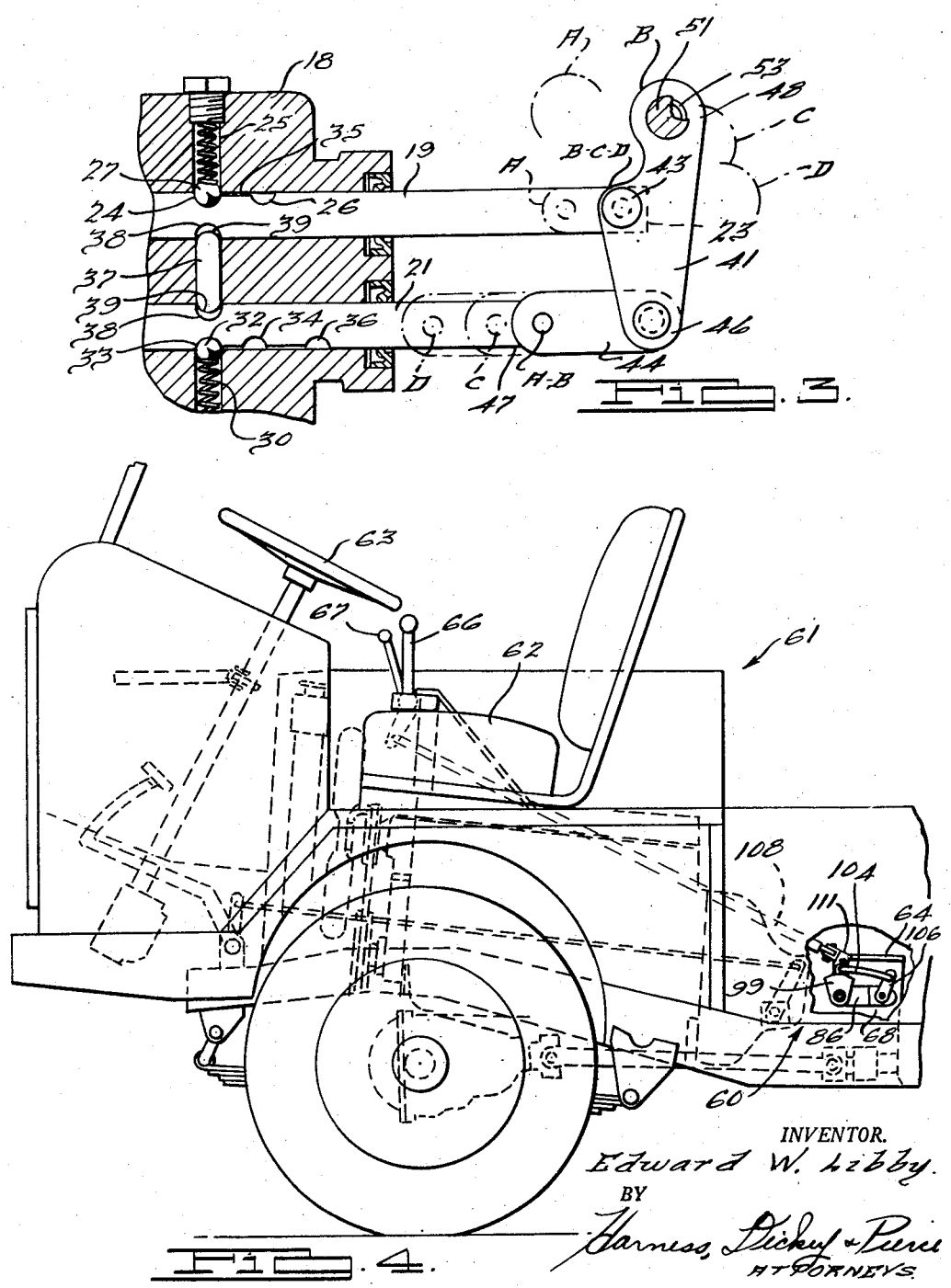
INVENTOR.
Edward W. Libby.
BY
Harness, Dickey & Pierce
ATTORNEYS July 14, 1959  E. W. LIBBY  2,894,410
VEHICLE TRANSMISSION CONTROL
Filed Sept. 6, 1956  3 Sheets-Sheet 3
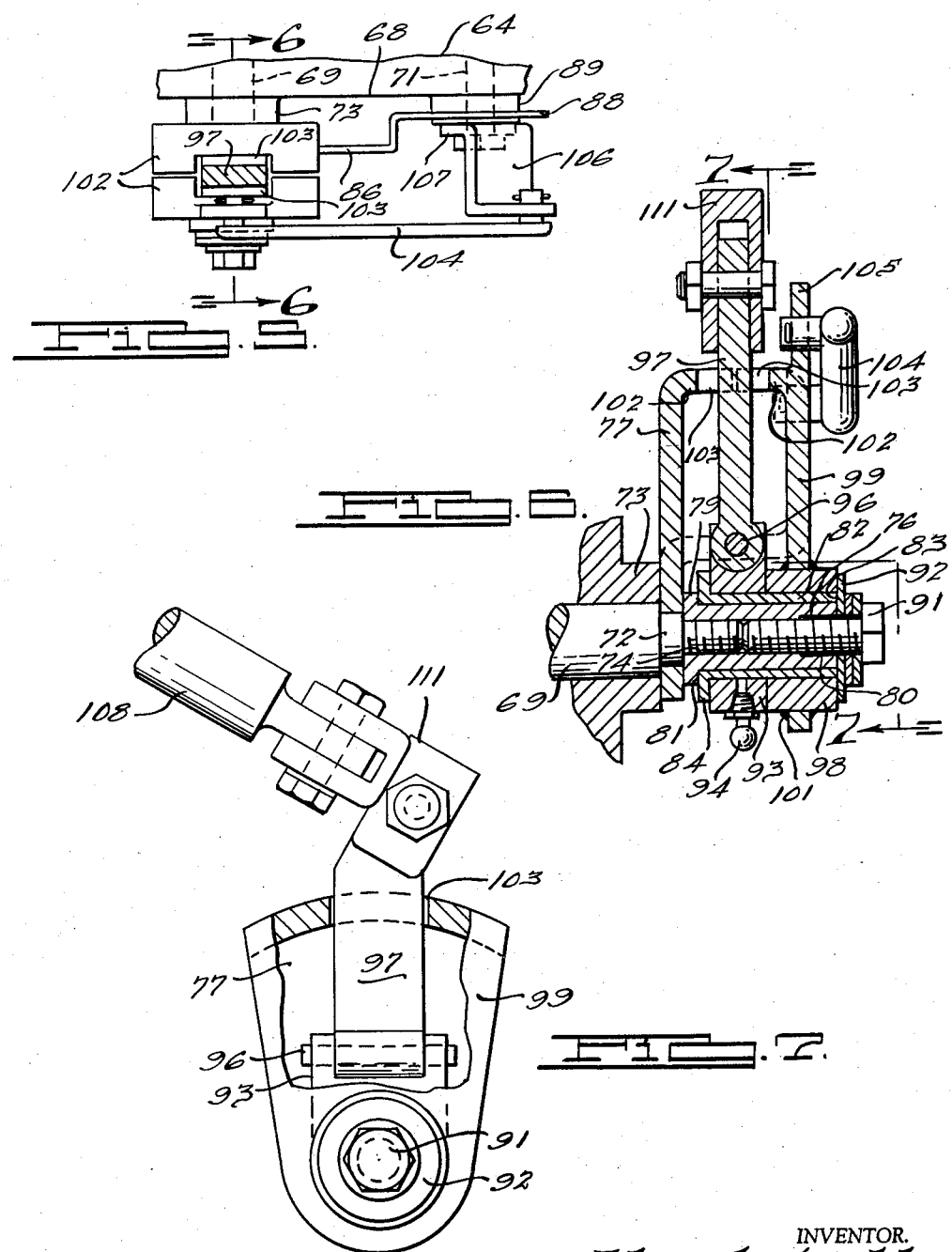
INVENTOR.
Edward W. Libby
BY
Harness, Dickey & Pierce
ATTORNEYS

United States Patent Office 2,894,410
Patented July 14, 1959

2,894,410

VEHICLE TRANSMISSION CONTROL

Edward W. Libby, Belleville, Mich., assignor, by mesne assignments, to Bank of America National Trust and Savings Association, a national banking association Application September 6, 1956, Serial No. 608,361

5 Claims. (Cl. 74—473)

This invention relates generally to vehicles and more particularly to a lever control for the transmission driving gears therefor.

Prior vehicles and particularly those of military type have included a number of gear control or shift levers which complicate assembly and driving of the vehicle.

An object of this invention, therefore, is to provide gear control apparatus which reduces the number of control levers required.

Another object of this invention is to provide a single lever control apparatus which is operable to move a pair of gear actuating members in a predetermined manner.

A further object of this invention is to provide a vehicle with a single shift lever conveniently positioned adjacent the vehicle driver's seat and operable therefrom to selectively manipulate a pair of gear actuating shafts or members carried in a gear housing.

Another object of this invention is to provide a single lever control apparatus for a pair of gear actuating shafts which are slideable axially thereof relative to a gear housing for actuating the gears in the housing.

A further object of this invention is to provide a single lever control apparatus for a pair of gear actuating shafts which are rotatable relative to a gear housing for actuating the gears in the housing.

Still a further object of this invention is to provide a vehicle with a lever operated control apparatus for a pair of gear actuating members which is simple in construction, economical to manufacture, and which is readily operable by the vehicle driver to provide the desired gear actuation.

Further objects, features and advantages of this invention will become apparent from a consideration of the following description when taken in connection with the accompanying drawing in which:

Fig. 3 is a top plan view of the control apparatus of this invention and the portion of the transfer case on which the apparatus is assembled with some parts broken away and other parts shown in section for the purpose of clarity;

Fig. 4 is a foreshortened side elevational view of a forward control type vehicle showing a modified form of the transmission control apparatus of this invention in assembly relation therewith;

Fig. 5 is a fragmentary enlarged top plan view of the modified form of control apparatus of this invention showing the mounting of the apparatus on one side of a transmission housing;

Fig. 6 is an enlarged transverse sectional view looking along the line 6—6 in Fig. 5; and Fig. 7 is a view looking along the line 7—7 in Fig. 6, with some parts broken away for the purpose of clarity.

Figure 1:
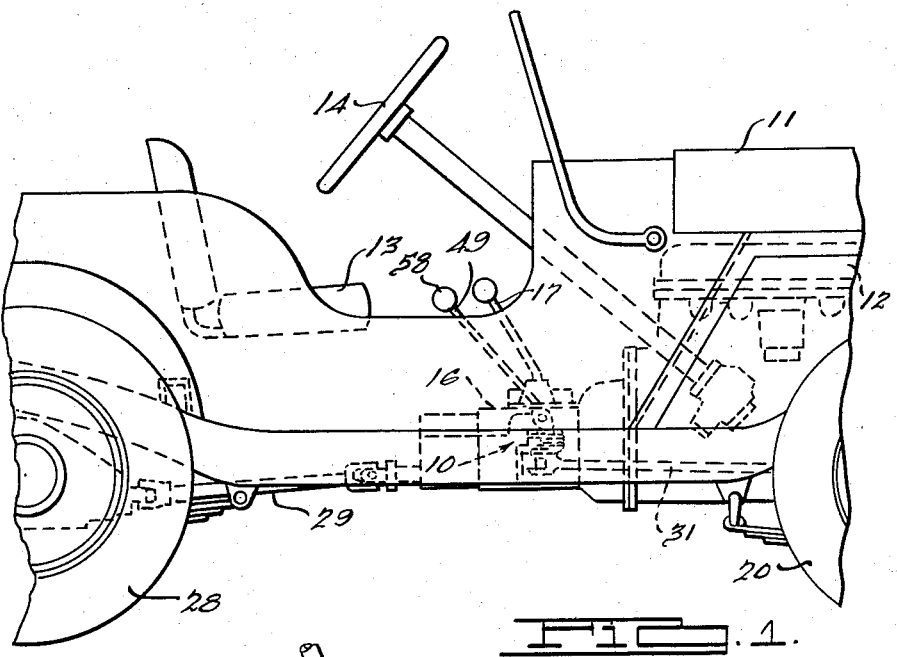
Fig. 1 is a foreshortened side elevational view of a vehicle of the selective four wheel drive type showing one form of the control apparatus of this invention in assembly relation therewith.
Figure 2:
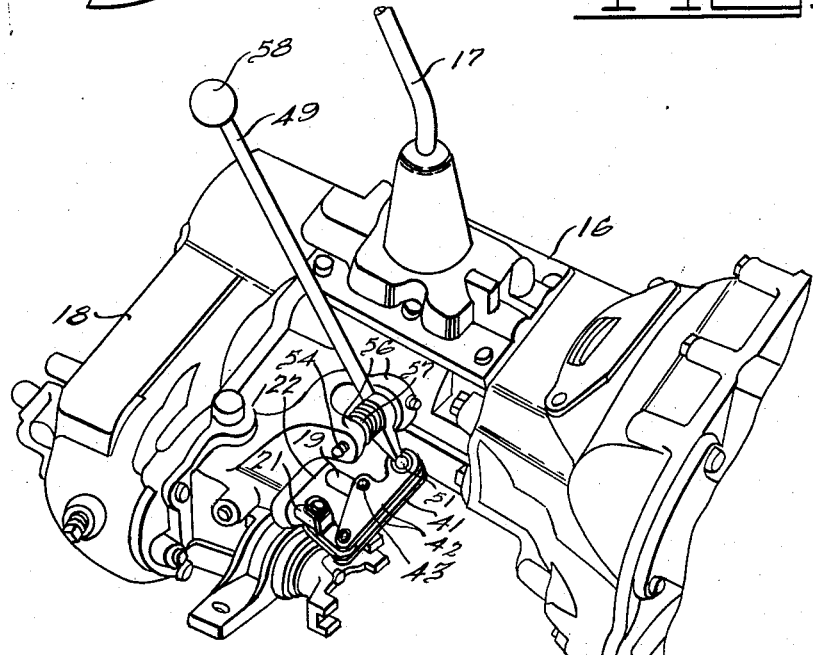
Fig. 2 is an enlarged fragmentary perspective view of the transmission and transfer case in the vehicle illustrated in Fig. 1 showing the control apparatus of this invention mounted thereon.

With reference to the drawing, one form of the control apparatus of this invention, indicated generally at 10, is illustrated in Fig. 1 in assembly relation with a four wheel vehicle 11 having an engine 12, a driver's seat 13, and a steering wheel 14. The vehicle 11 is also provided with a transmission housing 16 (Figs. 1 and 2), for the usual gear mechanism (not shown), having an upwardly and rearwardly inclined control or shift lever 17 positioned adjacent the driver's seat 13. The shift lever 17 is operable to obtain the normal three forward speeds and reverse from the vehicle 11. Disposed at one side of the transmission housing 16 and secured thereto is a housing 18, generally referred to as a transfer case, for auxiliary transmission gearing mechanism (not shown).

The transfer case 18 contains gear mechanism for selectively providing a driving connection to the vehicle front wheels 20 as well as for providing further lower vehicle speeds not obtainable with the regular transmission mechanism. The transfer case 18 supports a pair of shafts 19 and 21 (Figs. 2 and 3) extended longitudinally of the vehicle 11 and projected forwardly through the front side 22 of the transfer case 18. The shaft 19 is provided inwardly of its outer end 23 and at a position within the transfer case 18 with a pair of longitudinally spaced grooves or recesses 24 and 26, one or the other of which receives a spring urged ball 27, projected outwardly of an opening 25 in the transfer case 18.

In the outer position of the shaft 19, in which the ball 27 is received in the recess 24, as illustrated in Fig. 3, a drive is established to the vehicle rear wheels 28 (Fig. 1) through a propeller shaft 29 extended rearwardly from the transfer case 18. Also, in its outer position, the shaft 19 actuates a clutch (not shown) in the transfer case 18 to provide a drive to the front wheels 20 through a propeller shaft 31 extended forwardly from the transfer case 18. In the inward position of the shaft 19, in which the ball 27 is received in the recess 26, the shaft 19 actuates the corresponding clutch in a reverse direction, to disengage the drive for the propeller shaft 31 and provide a drive only for the rear vehicle wheels 28. The surface of the shaft 19 is relieved, as indicated at 35, intermediate the recesses 24 and 26 to facilitate movement of the shaft 19 between positions in which the ball 27 is received in the recesses 24 and 26.

The shaft 21 is similarly movable axially thereof relative to the transfer case 18 between three positions corresponding to the reception of a spring urged ball member 32 positioned in an opening 30 in the transfer case 18 in three grooves or recesses 33, 34 and 36 formed in longitudinally spaced portions of the shaft 21. On movement in a direction axially thereof, the shaft 21 operates a shiftable gear (not shown) in the transfer case 18 for effecting higher gear ratios to thus obtain much lower speeds for the vehicle than are obtainable only by use of the transmission gearing in the housing 16. The gear mechanism in the transfer case 18 thus operates, in conjunction with the gearing contained in the transmission housing 16, to give a series of lower speeds and thus provide for the transmission of increased power to the vehicle which is especially adapted for travel over rough terrain and the like. In the outer position of the shaft illustrated in Fig. 3, in which the ball 32 is in the recess 33, a speed of the vehicle 11 in a "high range" is provided. In an intermediate position of the shaft 21, with the ball 32 in the recess 34, "neutral" is effected and in an inner position of the shaft 21, in which the ball 32 is in the recess 36, a "low range" of speed is provided. The surface of the shaft 21 is similarly relieved between the recesses 33, 34 and 36 to facilitate shaft movement between ball seating positions.

A flat key member 37 is slideably mounted in the housing 18 between the shafts 19 and 21 for releasably maintaining one shaft in a predetermined position during axial movement of the other shaft. Each of the shafts 19 and 21 is provided with a recess 38, which in the positions of the shafts 19 and 21, illustrated in Fig. 3, are arranged opposite the key 37 which is of a length to project partially into both recesses 38. When the key 37 is moved to a position fully received in one of the recesses 38, it is fully withdrawn from the other recess 38. As a result, on axial movement of one of the shafts 19 and 21, the portion thereof forming the recess 38 acts as a cam and coacts with the adjacent rounded end portion 39 of the key 37 to move the key 37 into the recess 38 in the other shaft 19 or 21, to thus lock such shaft against axial movement. For example, when the shaft 19 is moved inwardly of the housing 18 from the position illustrated in Fig. 3, the key 37 is moved into the recess 38 in the shaft 21 to lock the shaft 21. Such locking action of key 37 continues until the shaft 19 is moved outwardly of the case 18 to a position in which the ball 27 is again received in the recess 24. The shaft 21 may then be moved axially and on initial movement, acts to lock the shaft 19 in a position in which the key 37 is received in the groove 38 in the shaft 19, which corresponds to a position of the ball 27 in the recess 24.

For manipulating the shafts 19 and 21, a lever unit 41, formed of a pair of flat vertically spaced plates 42, is directly connected intermediate the ends thereof by a pivot 43 to the outer end 23 of the shaft 19. A link unit 44 is pivotally connected to and extended between one end 46 of the lever unit 41 and the outer end 47 of the shaft 21. The opposite end 48 of the lever unit 41 is swivelly connected to the lower end of a shift lever 49 which is formed with a ball 51 (Fig. 2) movably supported in a chamfered opening 53 in the upper one of the plates 42 for the lever unit 41. The shift lever 49 is pivotally supported for back and forth movement on a pin 54 carried by a pair of forwardly projected ears 56 on the transfer case 18 and extended through an intermediate portion of the lever 49. A spring 57 on the pin 54 extends between one of the ears 56 and the lever 49 for providing a yieldable force to releasably maintain the lever 49 in a moved position. The upper end 58 of the lever 49 is arranged at a convenient location for hand operation from the driver's seat 13.

In use, assume that the lever unit 41 is in the position shown in full lines in Fig. 3, which position is designated by the letter B, so that a four wheel drive in the "high range" is provided. If only a two wheel drive is desired, the lever unit 41 is swung in a counterclockwise direction as viewed in Fig. 3 by moving the upper end 58 of the shift lever 49 forwardly of the vehicle 11. Such movement of the lever unit 41 moves the shaft 19 inwardly of the housing 18 to thus move the key 37 to a position fully projected into the recess 38 in the shaft 21 to maintain the shaft 21 in a fixed position. When the shaft 19 has been moved inwardly to a position in which the ball 27 is in the recess 26, which position of the lever unit 41 is indicated in dotted lines at A in Fig. 3, the drive for the propeller shaft 31 is discontinued and the vehicle 11 is provided with a two wheel drive.

If the upper end of the shift lever 49 is then moved rearwardly, the lever unit 41 is first returned to position B (Fig. 3) since the key 39 maintains the lever 21 in a fixed position and permits movement only of the shaft 19. On further rearward movement of the upper end 58 of the shift lever 49, the shaft 21 is moved inwardly of the housing 18, with the key 37 acting to lock the shaft 19 in a position in which the ball 27 is received in the recess 24. The shaft 21 is movable inwardly to a first position, in which the lever unit 41 is in the position indicated at C in Fig. 3, corresponding to "neutral" in which the ball 32 is seated in the recess 34. On continued rearward movement of the shift lever upper end 58, the lever unit 41 is movable to the position indicated at D in Fig. 3 in which the shaft 21 is moved to its inner position, in which the ball 32 is received in the recess 36, corresponding to a "low range" drive. For the purpose of clarity, the pivotal connection 43 of the shaft 19 and the lever unit 41 and the pivotal connection for the link unit 44 and the shaft 21 are designated in Fig. 3 with letters indicating the positions thereof corresponding to the moved positions of the lever unit 41.

It can thus be seen that on continued forward movement of the upper end 58 of the shift lever 49, the gear mechanism in the transfer case 18 is progressively shifted from "four wheel drive—low range" to "two wheel drive—high range." Conversely, on continued rearward movement of the upper end of the shift lever 49, the gears are progressively shifted from "two wheel drive—high range" to "four wheel drive—low range." By virtue of the coaction of the lever unit 41 with the shafts 19 and 21, such shifting is accomplished with only the single shift lever 49.

It is apparent that while the lever unit 41 is illustrated as being directly connected to the shift lever 49, in those cases in which the transfer case 18 is more remotely located relative to the operator seat 13, a remote control connection is assembled between the shift lever 49 and the lever unit 41 to obtain the same results described above.

A modified form of control apparatus of this invention, indicated generally at 60, is illustrated in Fig. 4 in assembly relation with a forward control type vehicle 61 having a driver's seat 62 and a steering wheel 63 positioned at the front end of the vehicle. The vehicle 61 has the usual housing 64 for a transmission gear mechanism (not shown) which is under the control of an upright shift lever 66 positioned to one side of and adjacent the driver's seat 62. A brake or other control lever 67 is positioned to one side of the shift lever 66.

Extended outwardly from one side 68 (Figs. 4 and 5) of the transmission housing 64, are a pair of actuating shafts 69 and 71, arranged in a side by side relation and rotatably mounted for actuating the transmission gear mechanism. The shaft 69 is rotatable between two positions providing "second" and "high" gears for the vehicle 61 and the shaft 71 is similarly rotatable between two positions providing "low" and "reverse," respectively, for the vehicle 61.

As best appears in Fig. 6, the shaft 69 terminates in a reduced portion 72, arranged outwardly of a shaft supporting boss 73 on the housing 64, and provided with a threaded extension 74. A combination nut and hub member 76 is threaded onto the extension 74 into engagement with an arm member 77 arranged on the reduced shaft portion 72 and extended upwardly therefrom to secure the arm 77 to the shaft 69. The arm 77 is swingable in one direction from the neutral position illustrated in Figs. 4, 5 and 7 to actuate the shaft 69 to move the transmission gear mechanism into "second" and in an opposite direction to move the mechanism into "high."

The combination member 76 is provided at its inner end 78 with an enlarged diameter portion 79 which forms a shoulder 81 arranged outwardly of the arm 77. A sleeve 82 positioned on the combination member 76 at a position against the shoulder 81, has one end 83 positioned slightly outwardly of the combination member 76 and has its opposite end 84 provided with a laterally extended leg 86 which terminates in an end portion 88 received on a supporting boss 89 formed on the housing 64 for the shaft 71. The support of the leg 86 on the boss 89 maintains the sleeve 82 against rotation on the combination member 76 and provides for a positive support of the sleeve 82.

A cap screw 91 provided with an enlarged washer 92 positioned against the outer end 83 of the sleeve 82, is threaded into the outer end of the combination member 76 to a position against the threaded shaft extension 74. As a result, the cap screw 91 functions both as a lock for the member 76 and a retainer for the sleeve 82. A portion of the combination member 76 is counterbored, as indicated at 80 (Fig. 6), for receiving a short cap screw (not shown) to tighten the combination member 76 on the extension 74 prior to the assembly of the sleeve 82 therewith. The function of the combination member 76 is to extend an existing shaft 69 for the support of the control apparatus 60 thereon. However, in those cases in which the shaft 69 can be initially formed for assembly with the control apparatus 60, the shaft 69 is of a length to support the sleeve 82, with the arm member 77 being secured to the shaft 69 outwardly of the sleeve 82, so that the combination member 76 is eliminated.

Rotatably supported on the sleeve 82, at a position against the leg 86, is a collar 93 provided with a grease fitting 94 and a transversely extended pivot 96. An upwardly extended lever 97 is supported on the pivot 96 for swinging movement about the pivot 96 toward and away from the arm 77.

A tubular member 98, rotatably supported on the sleeve 82 at a position between the collar 93 and the washer 92, carries a vertically extended bracket member 99, secured as by welding 101 to the tubular member 98. As best appears in Figs. 5 and 6, the arm 77 and the bracket member 99 are positioned on opposite sides of the pivoted lever 97 and terminate at their upper ends in horizontally extended portions 102 directed toward each other and formed with oppositely disposed rectangular notches 103, each of which is of a size to completely receive the lever 97 for a purpose to appear later. At its upper end, the bracket member 99 is formed with an ear 105 which pivotally supports one end of a crossover link 104. The opposite end of the link 104 is pivotally connected to the upper end of an arm 106, having an inwardly offset lower portion 107, secured at its lower end to the shaft 71. As best appears in Fig. 4, the link 104 is bent intermediate its ends so that at the time of installation this bend may be increased or decreased to adjust the effective length of the link 104 to the required distance between the bracket member 99 and the arm 106. On swinging movement of the arm 106 in one direction, from the "neutral" position illustrated in Fig. 4, the shaft 71 is rotated to provide for movement of the transmission gear mechanism into "first gear" and in an opposite direction to provide for "reverse."

In operation, the shift lever 66 which is mounted for movement through the usual H pattern, is operable through a connecting link 108 to move the pivoted lever 97 into either of the notches 103 in the arm 77 and the bracket 99 and to swing the lever 97 in either direction about the supporting sleeve 82. The link 108 is provided with an L-shape connector 11 which is attached to and extended between the ends of the link 108 and the lever 97. The connector 111 provides a lash free connection of the link 108 and the lever 97.

Assume that the lever 97 has been moved into the notch 103 for the arm 77. On swinging movement of the lever 97 in one direction, the shaft 69 is rotated in the same direction by the arm 77. The shift lever 66 is operable, therefore, to rotate the shaft 69 to thus put the vehicle 61 in either second or high gear. Similarly, on operation of the shift lever 66 to move the lever 97 in an opposite direction about the pivot 96 into the notch 103 in the bracket 99, on swinging movement of the lever 97 in response to operation of the shift lever 66 the bracket member 99 is swung with the lever 97 in either of two directions to similarly move the arm 107 and the shaft 71 by means of the link 104. It can thus be seen that the lever 97 is operable to rotate the shaft 71 in opposite directions to put the vehicle 61 in either first or reverse gear. Accordingly both of the shafts 69 and 71 are selectively rotatable on initial operation of the shift lever 66 from a neutral position in which the lever 97 is opposite both the notches 103. By virtue of the rotatable support of the collar 93 and the tubular member 98 on the sleeve 82, when the arm 77 is swung, the bracket 99 remains in a neutral position and when the bracket 99 is swung the arm 77 remains in a neutral position.

From the above description, it is seen that this invention provides in one embodiment a single shift lever 49, which is operable to move a pair of slideable gear actuating shafts 19 and 21 to a plurality of desired positions. In another embodiment a single shift lever 66 is operable to move a pair of rotatable gear actuating shafts 69 and 71 between predetermined desired positions. As a result a minimum number of operating levers are required for the vehicles 11 and 61 to thus simplify vehicle operation.

Although the invention has been described with respect to several embodiments thereof, it is to be understood that it is not to be so limited, since changes can be made therein which are within the scope of the invention as defined by the appended claims.

What I claim is:

1. For use with a gear housing having a pair of gear actuating shafts arranged in a side by side relation therein and projected through said housing at one side thereof, with each of said shafts being mounted for axial movement relative to said housing between a pair of stop positions, a lever member arranged outwardly of said housing and pivotally connected to said shafts so that on swinging movement of said lever member in one direction from a first position one of said shafts is moved axially thereof relative to said housing and on swinging movement of said lever member in an opposite direction from said first position the other one of said shafts is moved axially thereof relative to said housing and means movably mounted on said housing for selective engagement with said shafts to maintain one shaft in a stationary position during axial movement of the other shaft.

2. In combination with a vehicle having a transmission housing and a transfer case mounted on said housing, said transfer case having first and second shafts therein and projected through one side thereof, said first shaft being movable axially thereof relative to said housing between first and second positions corresponding to two and four wheel drive conditions of said vehicle, said second shaft being movable axially thereof relative to said housing between three positions corresponding to "neutral," "high range" and "low range" drive conditions of said vehicle, a lever arranged outwardly of said housing and pivotally connected to said first shaft for selectively moving said shaft to said positions, link means pivotally connecting said lever to said second shaft to provide for movement of said second shaft to said positions, and means movably mounted on said housing engageable with said first shaft to maintain said shaft in said second position during movement of said second shaft and engageable with said second shaft to maintain said shaft in the "high range" position during movement of said first shaft.

3. In combination with a vehicle having a transmission housing and a transfer case mounted on said housing, said transfer case having first and second shafts therein and projected through one side thereof, said first shaft being movable axially thereof relative to said case between first and second positions corresponding to two and four wheel drive conditions of said vehicle, said second shaft being movable axially thereof relative to said housing between three positions corresponding to "neutral," "high range" and "low range" speed conditions of said vehicle, a lever arranged outwardly of said case and pivotally connected to said first shaft for selectively moving said shaft to said positions, link means pivotally connecting said lever to said second shaft to provide for movement of said second shaft to said positions, a key member mounted on said case between said shafts, and groove means in said first and second shafts at positions opposite said key member in the second and "high range" positions thereof, respectively, said key member being movable into the groove means in said first shaft to releasably hold the first shaft in the second position thereof during movement of said second shaft and movable into the groove means in said second shaft to lock said second shaft in the "high range" position thereof during movement of said first shaft.

4. In combination with a gear housing having a pair of gear actuating members projected through one side thereof, said members being movable longitudinally thereof relative to said housing between predetermined gear actuating positions, a lever arranged outwardly of said housing and pivotally connected intermediate the ends thereof to one of said members, link means pivotally connected to and extending between one end of said lever and the other one of said members, lever actuating means connected to the opposite end of said lever for moving said lever in opposite directions from one position thereof, and locking means positioned between and operatively associated with said actuating members for movement in one direction in response to movement of said lever in one direction from said one position thereof to lock one actuating member against longitudinal movement thereof and in an opposite direction to lock the other actuating member in response to movement of said lever in an opposite direction from said one position thereof.

5. In combination with a vehicle having an operator portion, a transmission housing and a transfer case mounted on said housing, said transfer case having first and second gear actuating shafts arranged with the outer ends thereof outwardly of said transfer case, said first shaft being movable axially thereof relative to said case between first and second positions corresponding to two and four wheel drive conditions of said vehicle, said second shaft being movable axially thereof relative to said case between three positions corresponding to "neutral," "high range" and "low range" speed conditions of the vehicle, a lever pivotally connected intermediate the ends thereof to the outer end of said first shaft for selectively moving said shaft to said positions, link means pivotally connected to and extended between one end of said lever and the outer end of said second shaft to provide for movement of said second shaft to said positions, a key member mounted on said case between said shafts, groove means in said first and second shafts at positions opposite said key member in the second and "high range" positions thereof respectively, said key member being movable into the groove means in said first shaft to releasably maintain the first shaft in the second position thereof during movement of said second shaft and movable into the groove means in said second shaft to lock said second shaft in the "high range" position thereof during movement of said first shaft, and lever actuating means connected to said lever and operable from said operator portion for swinging said lever to move said shafts between said positions.

References Cited in the file of this patent

UNITED STATES PATENTS

| | | |
|---|---|---|
| 2,299,889 | Fishburn | Oct. 27, 1942 |
| 2,328,227 | Orr | Aug. 31, 1943 |
| 2,775,134 | Swenson | Dec. 25, 1956 |